United States Patent [19]
Lin et al.

[11] Patent Number: 5,468,275
[45] Date of Patent: Nov. 21, 1995

[54] APPARATUS HAVING ELONGATED ORIFICES FOR CENTRIFUGING DUAL-COMPONENT, CURLY, GLASS FIBERS

[75] Inventors: David C. K. Lin, Worthington; Patrick M. Gavin, Newark, both of Ohio

[73] Assignee: Owens-Corning Fiberglas Technology, Inc., Summit, Ill.

[21] Appl. No.: 275,179

[22] Filed: Jul. 14, 1994

Related U.S. Application Data

[63] Continuation of Ser. No. 147,762, Nov. 5, 1993, abandoned.
[51] Int. Cl.⁶ .......................... C03B 37/04; C03B 37/075
[52] U.S. Cl. .......................... 65/497; 65/504; 65/521; 65/502; 425/8; 425/DIG. 217; 264/168; 264/DIG. 26; 264/DIG. 29; 264/211.1
[58] Field of Search .......................... 65/502, 504, 516, 65/521, 438, 459, 470, 497; 264/211.1, DIG. 26, DIG. 29, 168, 174, 8; 425/8, DIG. 217

[56] References Cited

U.S. PATENT DOCUMENTS

| | | |
|---|---|---|
| 2,927,621 | 3/1960 | Slayter et al. . |
| 2,998,620 | 9/1961 | Stalego . |
| 3,073,005 | 1/1963 | Tiede . |
| 3,480,996 | 10/1969 | Matsui .......................... 264/DIG. 64 |
| 4,622,054 | 11/1986 | Huey et al. . |
| 4,863,502 | 9/1989 | Schlachter . |

FOREIGN PATENT DOCUMENTS

| | | |
|---|---|---|
| 190011 | 8/1986 | European Pat. Off. . |
| 196194 | 10/1986 | European Pat. Off. . |
| 2141853 | 3/1973 | Germany . |
| 1100430 | 1/1968 | United Kingdom . |

OTHER PUBLICATIONS

Abstract for Japanese Document 7446346, May 1994.

*Primary Examiner*—David A. Simmons
*Assistant Examiner*—John Hoffmann
*Attorney, Agent, or Firm*—Ted C. Gillespie; C. Michael Gegenheimer; Robert L. Showalter

[57] ABSTRACT

Apparatus for making dual-component thermoplastic fibers, such as glass fibers, comprises a spinner having an orificed peripheral wall for centrifuging fibers from thermoplastic material, the spinner having vertically aligned compartments with first and second thermoplastic materials in alternate compartments, and a series of elongated orifices in the peripheral wall in communication with each of two adjacent compartments to enable centrifuging of both the first and second thermoplastic materials from a single orifice.

16 Claims, 3 Drawing Sheets

APPARATUS HAVING ELONGATED ORIFICES FOR CENTRIFUGING DUAL-COMPONENT, CURLY, GLASS FIBERS

This is a continuation of application Ser. No. 08/147,762, filed Nov. 5, 1993, now abandoned.

TECHNICAL FIELD

This invention relates to apparatus for the manufacture of fibers from thermoplastic materials, such as glass fibers and other mineral fibers, for such uses as insulation products. More particularly, this invention pertains to spinners for centrifuging dual-component fibers from two streams of molten thermoplastic material having distinct thermoplastic material compositions.

BACKGROUND OF THE INVENTION

Fibers of glass and other thermoplastic materials are useful in a variety of applications including acoustical or thermal insulation materials. The common prior art methods for producing glass fiber insulation products involve producing glass fibers from a rotary process. A single molten glass composition is forced through the orifices in the outer wall of a centrifuge or spinner, producing primarily straight glass fibers.

An improvement over conventional glass fibers, which are usually straight fibers, is the use of fibers which are curly (helical) or irregular in shape. These fibers can be made by joining two distinct glass streams, referred to as the A glass and the B glass, and centrifuging the dual glass stream into a curly (helical) fiber, or into an irregular dual-glass fiber. For purposes of this patent specification, in using the terms "glass fibers" and "glass compositions", "glass" is intended to include any of the glassy mineral materials, such as rock, slag and basalt, as well as traditional glasses. Thermoplastic materials and thermoplastic fibers include, in addition to glass and other mineral fibers, fibers from polymer materials, such as polyester fibers and polypropylene fibers.

Stalego in U.S. Pat. No. 2,998,620 discloses curly (helical) glass fibers of bicomponent glass compositions. Stalego teaches producing staple curly fibers by passing two glass compositions of differing thermal expansivity through the orifices of a spinner. The glasses are extruded as a dual glass stream in aligned integral relationship such that the fibers curl naturally upon cooling due to the differing thermal expansivity. Stalego discloses a spinner having vertically aligned compartments around the periphery of the spinner, with alternate compartments containing the different glasses, separated by vertical baffles. Stalego further teaches that an orifice wider than the baffle is to be drilled where the baffle intersects the spinner peripheral wall. Since the orifice is wider than the baffle, the orifice is in communication with both of the vertical compartments on either side of the baffle, and both the A glass and the B glass will exit the spinner from the orifice, forming a dual glass stream. There is a need for improving the delivery of dual glass streams of molten glass or other thermoplastic materials to form curly or irregularly-shaped glass or other thermoplastic fibers.

SUMMARY OF THE INVENTION

This need is met by the present invention whereby a series of orifices is positioned in the spinner peripheral wall in alignment with the baffles, and the orifices are elongated, having an aspect ratio greater than about 4:1. The elongation of the orifice enables the orifice to extend beyond the width of the baffle and be in communication with each of the two distinct thermoplastic materials. Also, the use of an elongated orifice facilitates the flow restriction, or metering of the molten thermoplastic material through the orifice, thereby enabling a control of the buildup or head of thermoplastic material within the spinner.

According to this invention, there is provided apparatus for making dual-component thermoplastic fibers comprising a spinner having an orificed peripheral wall for centrifuging fibers of thermoplastic material, the spinner being divided by baffles into a series of vertically aligned compartments positioned circumferentially around the interior of the peripheral wall; glass supply means for supplying a first molten thermoplastic material and a second molten thermoplastic material to the spinner; dividing means for directing the first thermoplastic material into alternate compartments and for directing the second thermoplastic material into the remaining compartments so that adjacent compartments contain thermoplastic material of different natures, and a series of orifices in the peripheral wall positioned in alignment with the baffles, the orifices being wider than the width of the baffles to provide communication to each of two adjacent compartments to enable centrifuging of both the first and second thermoplastic materials from a single orifice, the orifices being elongated with an aspect ratio within the range of from about 4:1 to about 30:1. The use of elongated orifices enables a higher number of orifices to be put into the spinner peripheral wall than would be possible with round orifices of the prior art. The packing density of elongated orifices is at least 25 percent greater than the packing density of round orifices.

In a preferred application of the invention the thermoplastic material is glass, and the spinner is adapted to receive two separate glass streams for fiberization into dual-glass fibers.

In another preferred embodiment of the invention the aspect ratio of the orifices is within the range of from about 6:1 to about 25:1. More preferably, the aspect ratio is within the range of from about 6:1 to about 20:1.

In another embodiment of the invention, the width of the orifices is set to restrict the flow of molten thermoplastic material through the orifices so that a head of molten thermoplastic material is developed within the spinner.

DETAILED DESCRIPTION OF THE PREFERRED EMBODIMENTS

The invention will be described in terms of apparatus for making irregularly-shaped dual-glass fibers, although it is to be understood that the invention encompasses apparatus for making not only other types of dual-glass fibers such as curly fibers, but also fibers of other thermoplastic material, such as polyester or polypropylene.

Figure 1:
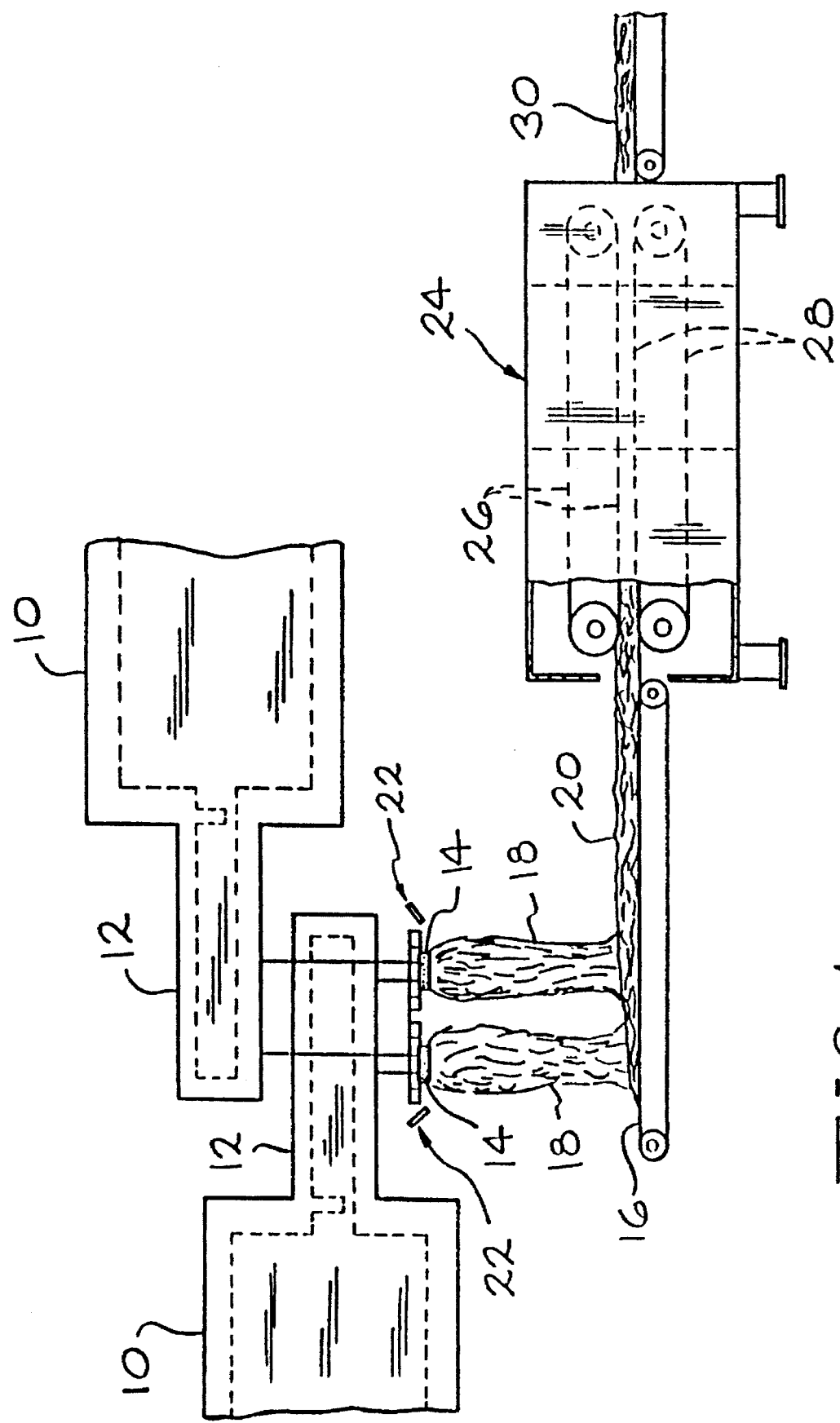
FIG. 1 is a schematic view in elevation of apparatus for making glass fibers according to the present invention.

The insulation products of irregularly-shaped glass fibers can be produced from a rotary fiber forming and pack heat setting process as shown in FIG. 1. Two distinct molten glass compositions (A glass and B glass) are supplied from any suitable glass supply means, such as furnaces 10 and forehearths 12, to fiberizers 14. Veils 18 of dual-glass fibers, such as irregularly-shaped glass fibers, produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape.

The wool pack is then passed through oven 24 at heat setting temperatures from 700° to 1100° F. (371° to 593° C.). The heat setting temperature may be achieved either by retarding the cooling process after fiber forming to retain some of the heat from the fiber forming process, or by reheating the fibers in the heat setting oven. While passing through the oven, the wool pack is shaped by top conveyor 26 and bottom conveyor 28, and by edge guides, not shown. While in the oven, the glass fibers may be subjected to flows of hot gases to facilitate uniform heating. It is to be understood that heat setting is an optional aspect of the present invention. After a period of up to 10 minutes, the wool pack then exits the oven as insulation product 30.

Figure 2:
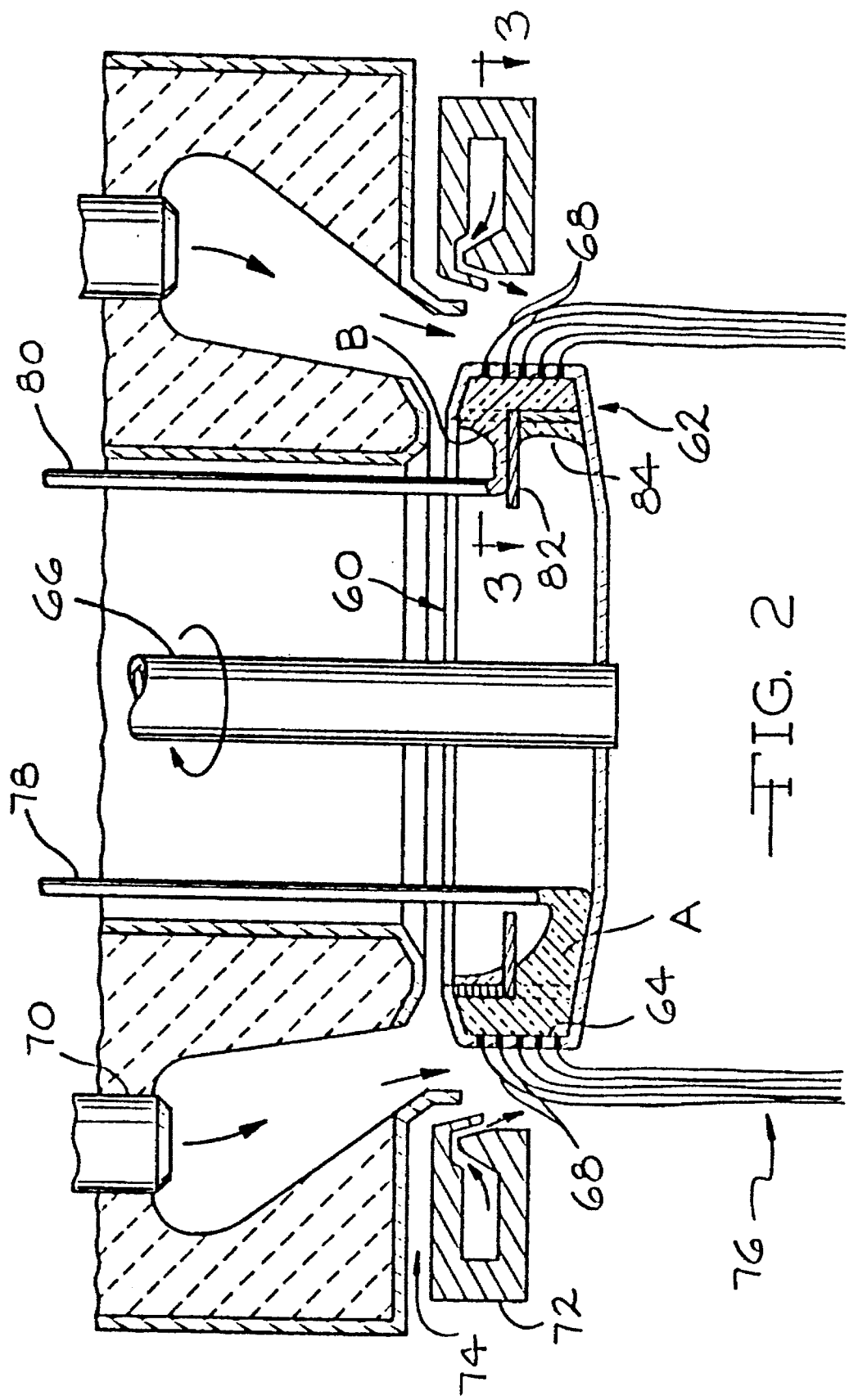
FIG. 2 is a cross-sectional view in elevation of a fiberizer of the present invention.
Figure 3:
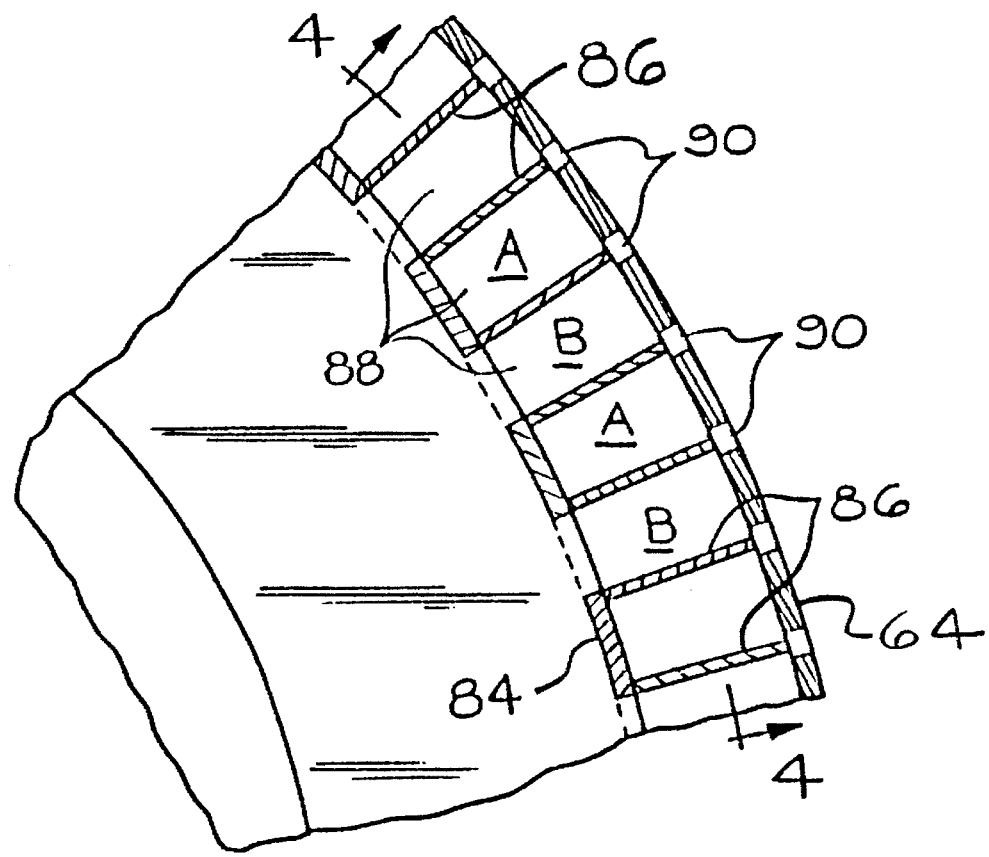
FIG. 3 is a plan view of a portion of the spinner of FIG. 2, taken along line 3—3.

As shown in FIG. 2, spinner 60 is comprised of spinner bottom wall 62 and spinner peripheral wall 64. The spinner is rotated on spindle 66, as is known in the prior art. The rotation of the spinner centrifuges molten glass through the spinner peripheral wall into primary fibers 68. The primary fibers are maintained in a soft, attenuable condition by the heat of annular burner 70. An internal burner, not shown, can also be used to provide heat to the interior of the spinner. Annular blower 72, using induced air 74, is positioned to pull the primary fibers and further attenuate them into secondary dual-glass fibers 76, suitable for use in wool insulating materials. The dual-glass irregularly-shaped glass fibers, are then collected for formation into a wool pack.

The interior of the spinner is supplied with two separate streams of molten glass, first stream 78 containing glass A and second stream 80 containing glass B. The glass in stream 78 drops directly onto the spinner bottom wall and flows outwardly with contrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed above the horizontal flange.

As shown in 2FIG. 3, the spinner is adapted with vertical interior wall 84 which is generally circumferential and positioned radially inwardly from the spinner peripheral wall. A series of vertical baffles 86, positioned between the spinner peripheral wall and the vertical interior wall, divide that space into a series of generally vertically aligned compartments 88. Alternate compartments contain either glass A or glass B. It can be seen that the horizontal flange, the vertical interior wall, and the baffles comprise a dividing means for directing glass A into alternate compartments and for directing glass B into the remaining compartments so that adjacent compartments contain different glass.

The spinner peripheral wall is adapted with orifices 90 which are positioned adjacent the radial outward end of the vertical baffle. The orifices have a width greater than the width of the vertical baffle, thereby providing communication with each of two adjacent compartments to enable centrifuging of both the A and B glasses from a single orifice. The orifices can be drilled into the spinner by any of several known drilling techniques, such as laser, electronic discharge milling (EDM), or electron beam drilling.

Figure 4:
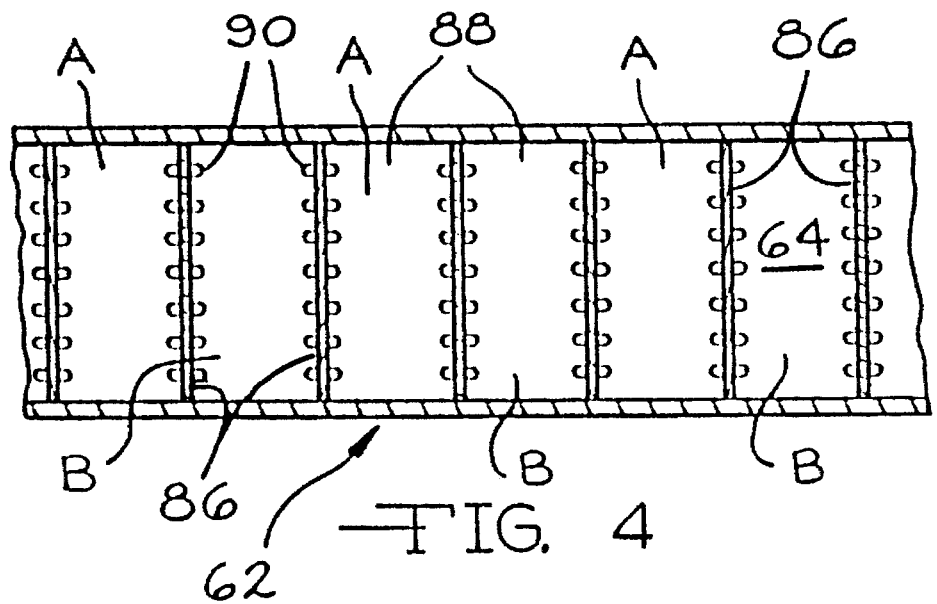
FIG. 4 is a schematic view in elevation of the spinner of FIG. 3 taken along line 4—4.

As can be seen in FIG. 4, each compartment 88 runs the entire height of spinner peripheral wall 64 with orifices along the entire vertical baffle separating the compartments. Other spinner configurations can be used to supply dual streams of glass to the spinner orifices.

The elongated orifices of the invention have an aspect ratio within the range of from about 4:1 to about 30:1. Preferably, the aspect ratio of the orifices is within the range of from about 6:1 to about 25:1. Most preferably, the the aspect ratio of the orifices is within the range of from about 6:1 to about 20:1. The orifices are generally horizontal.

A useful feature when employing the elongated orifices of the invention is that the narrow orifices can restrict or meter the flow of glass through the orifice. Proper sizing of the width of the orifice will enable a control of the throughput so that a supply or head of each glass can be established within the spinner.

We claim:

1. Apparatus for making dual-glass fibers comprising:
   a. a spinner having an orificed peripheral wall for centrifuging glass fibers, the spinner being divided by baffles into a series of compartments positioned circumferentially around the interior of the peripheral wall;
   b. glass supply means for supplying a first molten glass and a second molten glass to the spinner;
   c. dividing means for directing the first glass into alternate compartments and for directing the second glass into the remaining compartments so that adjacent compartments contain different glass; and
   d. a series of orifices in the peripheral wall positioned in alignment with the baffles, the orifices being wider than the width of the baffles to provide communication to each of two adjacent compartments to enable centrifuging of both the first and second glasses from a single orifice, the orifices being elongated with an aspect ratio within the range of from about 4:1 to about 30:1.

2. The apparatus of claim 1 in which the aspect ratio of the orifices is within the range of from about 6:1 to about 25:1.

3. The apparatus of claim 2 in which the aspect ratio of the orifices is within the range of from about 6:1 to about 20:1.

4. The apparatus of claim 1 in which the orifices are generally horizontal.

5. The apparatus of claim 1 in which the width of the orifices is set to restrict the flow of molten glass through the orifices so that a head of molten glass is developed within the spinner.

6. The apparatus of claim 5 in which the aspect ratio of the orifices is within the range of from about 6:1 to about 25:1.

7. The apparatus of claim 6 in which the aspect ratio of the orifices is within the range of from about 6:1 to about 20:1.

8. The apparatus of claim 5 in which the orifices are generally horizontal.

9. Apparatus for making dual-component fibers from thermoplastic material comprising:
   a. a spinner having an orificed peripheral wall for centrifuging fibers from thermoplastic material, the spinner being divided by baffles into a series of compartments positioned circumferentially around the interior of the peripheral wall;
   b. supply means for supplying a first molten thermoplastic material and a second molten thermoplastic material to the spinner;

c. dividing means for directing the first thermoplastic material into alternate compartments and for directing the second thermoplastic material into the remaining compartments so that adjacent compartments contain different thermoplastic materials; and d. a series of orifices in the peripheral wall positioned in alignment with the baffles, the orifices being wider than the width of the baffles to provide communication to each of two adjacent compartments to enable centrifuging of both the first and second thermoplastic materials from a single orifice, the orifices being elongated with an aspect ratio within the range of from about 4:1 to about 30:1.

10. The apparatus of claim 9 in which the aspect ratio of the orifices is within the range of from about 6:1 to about 25:1.

11. The apparatus of claim 10 in which the aspect ratio of the orifices is within the range of from about 6:1 to about 20:1.

12. The apparatus of claim 9 in which the orifices are generally horizontal.

13. The apparatus of claim 9 in which the width of the orifices is set to restrict the flow of molten thermoplastic material through the orifices so that a head of molten material is developed within the spinner.

14. The apparatus of claim 13 in which the aspect ratio of the orifices is within the range of from about 6:1 to about 25:1.

15. The apparatus of claim 14 in which the aspect ratio of the orifices is within the range of from about 6:1 to about 20:1.

16. The apparatus of claim 13 in which the orifices are generally horizontal.

* * * * *